United States Patent
Satoh et al.

(10) Patent No.: US 7,021,752 B2
(45) Date of Patent: Apr. 4, 2006

(54) WATER BASE INK FOR INK-JET RECORDING

(75) Inventors: Noriaki Satoh, Nagoya (JP); Masashi Tsuda, Aichi-ken (JP); Shunichi Higashiyama, Yotsukaichi (JP)

(73) Assignee: Brother Kogyo Kabushiki Kaisha (JP)

( * ) Notice: Subject to any disclaimer, the term of this patent is extended or adjusted under 35 U.S.C. 154(b) by 0 days.

(21) Appl. No.: 10/246,237

(22) Filed: Sep. 18, 2002

(65) Prior Publication Data

US 2003/0117475 A1 Jun. 26, 2003

(30) Foreign Application Priority Data

Sep. 20, 2001 (JP) ............................... 2001-286599

(51) Int. Cl.
*B41J 2/01* (2006.01)

(52) U.S. Cl. .................. 347/100; 347/95; 106/31.27

(58) Field of Classification Search ............... 347/100, 347/95, 96, 101; 106/31.6, 31.27, 31.13; 523/160

See application file for complete search history.

(56) References Cited

U.S. PATENT DOCUMENTS

| | | | | | |
|---|---|---|---|---|---|
| 4,256,493 | A | * | 3/1981 | Yokoyama et al. | 347/100 |
| 5,462,590 | A | * | 10/1995 | Yui et al. | 347/100 |
| 5,623,294 | A | * | 4/1997 | Takizawa et al. | 347/100 |
| 6,234,601 | B1 | * | 5/2001 | Hayashi et al. | 347/100 |
| 6,284,027 | B1 | * | 9/2001 | Auslander et al. | 106/31.15 |
| 6,500,248 | B1 | * | 12/2002 | Hayashi | 106/31.65 |
| 6,530,985 | B1 | * | 3/2003 | Matsumoto et al. | 106/31.47 |
| 6,644,798 | B1 | * | 11/2003 | Katsuragi et al. | 347/100 |
| 2002/0185038 | A1 | * | 12/2002 | Marritt | 347/100 |

* cited by examiner

*Primary Examiner*—Manish S. Shah
(74) *Attorney, Agent, or Firm*—Reed Smith LLP

(57) ABSTRACT

An ink for ink-jet recording includes water, a basic dye, and a specified pH-adjusting agent. Those usable as the pH-adjusting agent include, for example, monoethanolamine, diethanolamine, ammonium hydrogencarbonate, and sodium carbonate. An image, which is excellent in chromaticness and color feature, can be formed. Further, metal portions, especially an ink tank, a head, and ink flow passages thereof are prevented from corrosion which would be otherwise caused by the ink.

16 Claims, 3 Drawing Sheets

WATER BASE INK FOR INK-JET RECORDING

BACKGROUND OF THE INVENTION

1. Field of the Invention

The present invention relates to a water base ink for ink-jet recording to be used for an ink-jet recording apparatus, and to an ink-jet recording apparatus.

2. Description of the Related Art

Those known for the printer technique based on the ink-jet recording method include, for example, the bubble method in which an ink is discharged from a minute nozzle by the aid of bubbles generated by rapid heating, and the piezoelectric method in which an ink is discharged from a minute nozzle by using a piezoelectric device which is deformable in accordance with the voltage application. Inks, which have several colors respectively to serve as fundamental colors, are converted into minute droplets of several picoliters to several tens picoliters, and they are selectively landed on the recording paper surface to form an image thereby.

The ink-jet recording method is advantageous in the high letter-printing quality and the high image-printing quality owing to the discharge control of the minute droplets. An image, which has no granular texture, can be formed by landing the several picoliters of the minute droplets on the paper surface highly accurately. However, in order to successfully discharge the minute droplets as described above, it is necessary to adopt a technique for highly accurately controlling the discharge from the sufficiently thin nozzle. In order to achieve the highly accurate discharge control technique as described above, a highly accurate machining technique is required for major portions for constructing, for example, the ink flow passage and the printer head. In general, the material, which is cheap and which can be subjected to the highly accurate machining, is the metal material. Therefore, metal parts are used for major portions of the printer for which the strength and the durability are required.

Most of the ink-jet printers generally use the anionic dye ink in view of the toxicity and the coloring performance on the recording paper. However, the vividness or brilliantness is insufficient depending on the color (especially, in the case of the yellow). It is demanded to obtain a brilliant image as if the image is drawn by a marker pen. In order to satisfy such a demand, it is the best to use a basic dye having brilliant color development such as those used for the marker pen. However, the ink, which is based on the use of the basic dye, has low pH, in which it is feared that metal parts of the printer (including plated parts) may be corroded. Although the printer is constructed such that metal parts are not used for the parts which always make contact with the ink as far as possible, the following problem inevitably arises. That is, a slight amount of the ink is scattered during the printing or during the maintenance for the nozzle, and the ink adheres to the metal parts for constructing the printer, resulting in the corrosion of the metal and the deterioration of the printing stability. Therefore, usually, the basic dye ink should be used on condition that an alkaline pH-adjusting agent is added so that pH of the ink is neutral or alkaline. However, another problem has arisen as follows depending on the type of the pH-adjusting agent. That is, the chromaticness and the color feature of the printed image are changed, and the brilliantness, which is inherent in the basic dye, is spoiled. The present inventors have diligently made the study in order to solve the problem described above. As a result, it has been found out that the chromaticness and the color feature of the printed image are not changed when a pH-adjusting agent having a specified structure is used. Thus, the present invention has been completed.

SUMMARY OF THE INVENTION

That is, an object of the present invention is to provide an ink for ink-jet recording and an ink-jet recording apparatus which accommodates the same, wherein the brilliant chromaticness is retained for the ink based on the use of a basic dye, and metal parts are successfully prevented from corrosion which would be otherwise caused by the ink.

According to a first aspect of the present invention, there is provided an ink for ink-jet recording comprising water, a basic dye, and at least one pH-adjusting agent selected from compounds represented by the following general formulas (1) to (3).

(1)

wherein each of R1, R2, and R3 is independently H, an alkyl group, or an alkyl group partially substituted with OH.

wherein M represents a monovalent metal.

wherein A represents a monovalent metal or a group having ammonium.

Triethanolamine, which has been hitherto used as a dispersing agent in the conventional ink, is known as the compound represented by the general formula (1). However, there has been no case in which the compound represented by the general formula (1) such as triethanolamine is used together with the basic dye as in the present invention, for the following reason. That is, the basic dye is usually acidic, while triethanolamine is basic.

The reason, why the chromaticness and the color feature of the printed image are scarcely changed when the specified pH-adjusting agent as represented by the formulas (1), (2), and (3) described above is used, is indefinite. However, the following consideration may be made.

When the pH-adjusting agent represented by the formula (1) is used, the electron is not released directly from the nitrogen atom which is an electron-releasing group, because the side chain is the alkyl group or the alkyl group partially substituted with OH. Therefore, no strong reducing action is effected. Accordingly, it is possible to suppress the disturbance of the transition of the basic dye to the excited state, which would be otherwise caused by the N atom. Therefore, it is considered that the control of pH is successfully effected without disturbing the brilliant color development of the basic dye. On the other hand, when the pH-adjusting agents represented by the formulas (2) and (3) are used, the transition of the basic dye to the excited state is not disturbed, because these pH-adjusting agents are based on the monovalent metals, and hence they do not have any intense electron attractive property. Therefore, it is considered that the brilliant color development and the pH control are successfully made.

The pH-adjusting agent may be contained in an amount of 0.001 to 2% by weight, and preferably 0.01 to 1% by weight with respect to the total amount of the ink.

According to a second aspect of the present invention, there is provided an ink-jet recording apparatus comprising an ink-jet head, an ink tank which accommodates an ink to be supplied to the ink-jet head, and the ink of the present invention which is accommodated in the ink tank. The ink-jet printer of the present invention is based on the use of the ink of the present invention. Therefore, it is possible to form an image which is excellent in chromaticness and color feature. Further, metal portions, especially the ink tank, the head, and the ink flow passages thereof are prevented from corrosion which would be otherwise caused by the ink. The ink tank may be an ink container fixedly provided in the apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
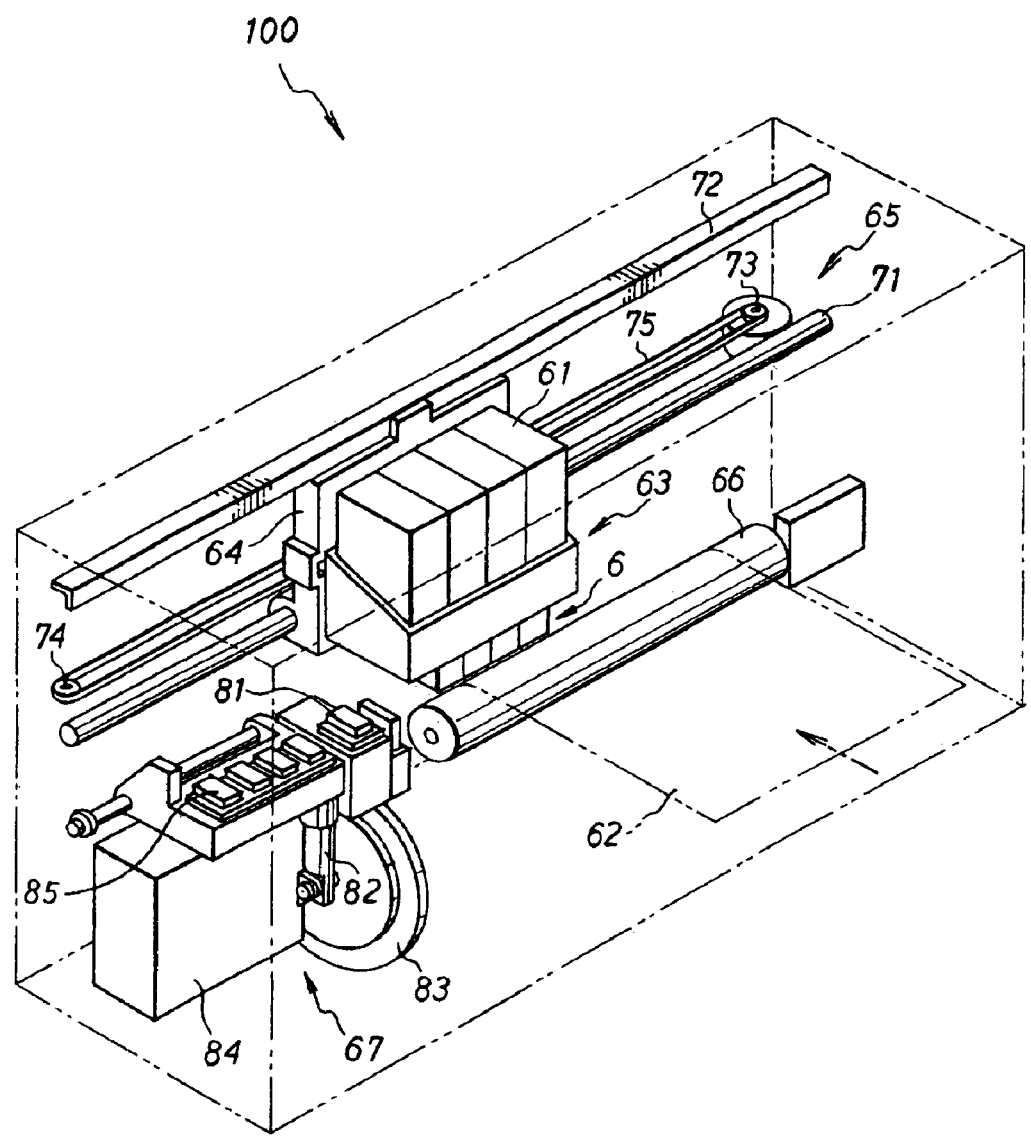
FIG. 1 is a perspective view showing a color ink-jet printer having an ink cartridge which contains ink prepared in examples of the invention.

Embodiments of the present invention will be explained below.

The water base ink for ink-jet recording of the present invention comprises at least water, the basic dye, and one or a plurality of pH-adjusting agent or pH-adjusting agents selected from the substances represented by the following formulas (1), (2), and (3). Further, a moistening agent and a permeating agent are generally added in addition to the substances described above.

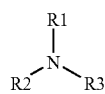
(1)

wherein each of R1, R2, and R3 is H, an alkyl group, or an alkyl group partially substituted with OH.

MOH (2)

wherein M represents a monovalent metal.

ACO₃ (3)

wherein A represents a monovalent metal or a group having ammonium.

It is desirable to use deionized water (pure water) for the water. In this case, it is desirable that the content of water is not less than 40% by weight with respect to the total amount of the ink, in order that the viscosity of the ink in the ordinary state is maintained to a low viscosity at which the ink is normally jetted.

Those usable as the basic dye include, for example, C. I. Basic Yellow 1, 2, 11, 13, 14, 19, 21, 25, 32, 33, 36, 37, 40, 51; C. I. Basic Orange 2, 15, 21, 22; C. I. Basic Red 1, 1:1, 2, 5, 6, 8, 9, 12, 13, 14, 19, 22, 29, 37, 38, 39, 92; C. I. Basic Violet 1, 2, 3, 4, 7, 10, 11:1, 14; C. I. Basic Blue 1, 3, 4, 5, 6, 7, 9, 11, 12, 16, 17, 19, 24, 25, 26, 28, 29, 41, 45, 54, 65, 66; C. I. Basic Green 1, 4; C. I. Basic Brown 1, 12; and C. I. Basic Black 2, 8. However, there is no limitation thereto. The basic dye is not limited to one species. The color tone may be adjusted by using two or more species in a mixed manner. The content of the dye is within a range of 0.1 to 10% by weight, and more preferably 0.5 to 5% by weight with respect to the total amount of the ink.

The pH-adjusting agent is added in order that pH of the ink is made to be approximately neutral or alkaline. The pH-adjusting agent is the substance which exhibits the alkaline feature when dissolved in water. The pH-adjusting agent is composed of one or a plurality of species selected from the substances represented by the following formulas (1), (2), and (3).

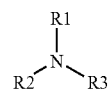
(1)

wherein each of R1, R2, and R3 is H, an alkyl group, or an alkyl group partially substituted with OH.

MOH (2)

wherein M represents a monovalent metal.

ACO₃ (3)

wherein A represents a monovalent metal or a group having ammonium.

Specifically, the substance represented by the formula (1) includes, for example, ammonia, monoethanolamine, diethanolamine, triethanolamine, 2-dimethylaminoethanol, N-methyl-2,2-iminodiethanol, diisopropanolamine, 1-amino-2-propanol, 3-amino-1-propanol, n-butylamine, sec-butylamine, tert-butylamine, N-n-butylethanolamine, N-tert-butylisopropylamine, diisopropylamine, diisobutylamine, dipentylamine, n-dodecylamine, di-n-butylamine, di-sec-butylamine, n-decylamine, di-n-dodecylamine, di-2-ethylhexylamine, N,N-diethylmethylamine, di-n-hexylamine, 1,3-dimethylbutylamine, N,N-dimethylethylamine, N,N-dimethyloctylamine, N,N-dimethylpropanolamine, and di-n-propylamine. It is preferable to use monoethanolamine or diethanolamine.

Specifically, the substance represented by the formula (2) includes, for example, lithium hydroxide, sodium hydroxide, potassium hydroxide, and cesium hydroxide.

Specifically, the substance represented by the formula (3) includes, for example, lithium carbonate, sodium carbonate, potassium carbonate, ammonium carbonate, and ammonium hydrogencarbonate. It is preferable to use ammonium hydrogencarbonate or sodium carbonate.

The pH-adjusting agent may be used singly. Alternatively, the pH-adjusting agents may be used in a mixed manner. As for the content of the pH-adjusting agent in the ink, if the content is larger than 2% by weight with respect to the total amount of the ink, for example, it is feared that any problem may arise such that the component may be deposited. Therefore, the content of the pH-adjusting agent is 0.001 to 2% by weight, and preferably 0.01 to 1% by weight with respect to the total amount of the ink.

The moistening agent is principally added in order to avoid the dry-up and the occurrence of deposition from the ink at the nozzle of the ink-jet head. The moistening agent includes, for example, polyalkylene glycols; alkylene glycols such as ethylene glycol, propylene glycol, butylene glycol, dipropylene glycol, triethylene glycol, tripropylene glycol, 1,2,6-hexane triol, thiodiglycol, 1,3-butanediol, 1,5-pentanediol, and hexylene glycol; glycerol; and pyrrolidones such as 2-pyrrolidone and N-methyl-2-pyrrolidone. The moistening agents as described above may be used in a mixed manner as well. The content in the ink is 5 to 50% by weight, and preferably 10 to 40% by weight with respect to the total amount of the ink. If the amount of the moistening agent is too small, then the moistening function is insufficient, and problems including, for example, the deposition and the dry-up arise. If the amount of the moistening agent is too large, the viscosity of the ink is unnecessarily increased. As a result, for example, problems arise such that the discharge failure occurs, and the ink is dried extremely slowly on the recording paper.

As for the permeating agent, it is desirable to use polyvalent alcohol monoalkyl ether having low odor with low vapor pressure. Those preferably usable as the polyvalent alcohol monoalkyl ether include those which improve the quick drying property of the ink on the recording paper surface, which avoid the bleeding (blurring at the boundary between different colors) caused by the slow drying property on the recording paper, and which hardly cause the feathering (whisker-like blurring formed along the fiber of the recording paper) caused by the permeation. Specifically, the polyvalent alcohol monoalkyl ether includes, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

It is preferable that the content of the polyvalent alcohol monoalkyl ether in the ink is 3 to 20% by weight with respect to the total amount of the ink. If the content is less than 3% by weight, then the permeation speed of the ink into the recording paper is slow, and problems arise in the drying time and the blurring. On the other hand, if the content exceeds 20% by weight, the ink intensely permeates into the recording paper. As a result, the ink consequently arrives at the back of the recording paper, and any problem arises in the blurring as well. In order to control the permeation and the drying performance of the ink with respect to the recording paper, it is also possible to use monovalent alcohol such as ethanol and isopropyl alcohol.

The ink of the present invention is basically constructed as described above. However, it is possible to optionally add, for example, hitherto known various types of permeating agents, resin binders, surfactants, viscosity-adjusting agents, surface tension-adjusting agents, dye-dissolving agents, antiseptic agents, and fungicides.

When the ink of the present invention is applied to the ink-jet system of the type in which the ink is discharged in accordance with the action of the thermal energy, values of thermal physical properties (for example, the specific heat, the coefficient of thermal expansion, and the coefficient of thermal conductivity) are adjusted in some cases.

Explanation will be made below for Examples in which the present invention is embodied and Comparative Examples.

EXAMPLE 1

Explanation will be made for Example in which a mixture of C. I. Basic Red 1 and C. I. Basic Yellow 40 was used as the basic dye, and monoethanolamine corresponding to the formula (1) was used as the pH-adjusting agent. (A) Respective materials shown in Table 1 below were weighed so that the total amount was 100 g, and they were sufficiently mixed and agitated, followed by performing filtration with a membrane filter of 0.2 µm to prepare Ink (a).

TABLE 1

| | |
|---|---|
| C. I. Basic Red 1 | 0.6 parts by weight |
| C. I. Basic Yellow 40 | 0.4 parts by weight |
| Polyethylene glycol | 12.0 parts by weight |
| 2-Pyrrolidone | 10.0 parts by weight |
| Polyvinyl pyrrolidone | 2.0 parts by weight |
| Triethylene glycol monobutyl ether | 6.0 parts by weight |
| Monoethanolamine (pH-adjusting agent) | 1.0 parts by weight |
| Pure water | 68.0 parts by weight | pH of Ink (a) was measured with "pH METER D-22" (produced by HORIBA, Ltd.). pH was alkaline, i.e., 10.5. (B) In order to investigate the degree of the change of the chromaticness of Ink (a) brought about by the addition of monoethanolamine, Ink (a-1) having the following composition, which did not contain monoethanolamine, was prepared. The preparation method was the same as that described above. That is, respective materials were weighed so that the total amount was 100 g, and they were sufficiently mixed and agitated, followed by performing filtration with a membrane filter of 0.2 µm.

TABLE 2

| | |
|---|---|
| C. I. Basic Red 1 | 0.6 parts by weight |
| C. I. Basic Yellow 40 | 0.4 parts by weight |
| Polyethylene glycol | 12.0 parts by weight |
| 2-Pyrrolidone | 10.0 parts by weight |
| Polyvinyl pyrrolidone | 2.0 parts by weight |
| Triethylene glycol monobutyl ether | 6.0 parts by weight |
| Pure water | 69.0 parts by weight | pH of Ink (a-1) was measured in accordance with the same method as that described above. pH was low and acidic, i.e., 5.2.

Solid printing of 2 cm squares was performed on recording paper of "BUSINESS MULTIPURPOSE 4200 PAPER" (produced by Xerox) with Ink (a) and Ink (a-1) by using an ink-jet printer "MFC-7400J" (produced by Brother Industries, Ltd.) respectively.

Printed matters with Ink (a) and Ink (a-1) were subjected to the color measurement (measurement of $L^*$, $a^*$, $b^*$) under a light source condition of $D_{65}$, 10° by using a colorimeter "CM-2002" (produced by Minolta Co., Ltd.) to calculate the color feature change and the chromaticness change in accordance with the following numerical expression (1).

$$\text{Color feature change} = \sqrt{\{(L_0^* - L^*)^2 + (a_0^* - a^*)^2 + (b_0^* - b^*)^2\}}$$

$$\text{Chromaticness change} = \sqrt{\{(a_0^*)^2 + (b_0^*)^2\}} - \sqrt{\{(a^*)^2 + (b^*)^2\}}$$

Result of color measurement for Ink (a): $L^*$, $a^*$, $b^*$;

Result of color measurement for Ink (a-1): $L_0^*$, $a_0^*$, $b_0^*$. (1)

The color feature change was 7.2, and the chromaticness change was 1.1, in each of which the amount of change was small. It is appreciated that any inconvenience such as discoloration is not caused by the addition of monoethanolamine as the pH-adjusting agent.

EXAMPLES 2 TO 12

Experiments were carried out in Examples 2 to 12 in exactly the same manner as in Example 1 except that monoethanolamine as the pH-adjusting agent used in Example 1 was changed to respective substances shown in Table 3. Results are summarized in Table 3 together with Example 1. The pH-adjusting agent of the formula (1) was used for Examples 1 to 7, the pH-adjusting agent of the formula (2) was used for Examples 8 and 9, and the pH-adjusting agent of the formula (3) was used for Examples 10 to 12.

TABLE 3

(Examples 1 to 12)

|  | pH-adjusting agent (1% by weight) | pH | Color feature change | Chromaticness change |
|---|---|---|---|---|
| Example 1 | monoethanolamine | 10.5 | 7.2 | 1.1 |
| Example 2 | diethanolamine | 9.9 | 3.5 | 0.1 |
| Example 3 | triethanolamine | 8.8 | 8.6 | 3.3 |
| Example 4 | 0.1 N ammonia | 6.8 | 2.5 | 2.1 |
| Example 5 | 2-dimethylaminoethanol | 10.2 | 6.9 | 2.3 |
| Example 6 | N-methyl-2,2-iminodiethanol | 9.5 | 2.7 | 1.0 |
| Example 7 | diisopropanolamine | 9.7 | 3.9 | 1.5 |
| Example 8 | 1 N potassium hydroxide | 8.9 | 2.5 | 0.6 |
| Example 9 | 1 N sodium hydroxide | 8.6 | 5.1 | 2.3 |
| Example 10 | ammonium hydrogencarbonate | 8.5 | 0.9 | 0.2 |
| Example 11 | lithium carbonate | 10.5 | 2.9 | 0.1 |
| Example 12 | sodium carbonate | 11.0 | 4.0 | 1.5 |

COMPARATIVE EXAMPLES 1 TO 7

Experiments were carried out in Comparative Examples 1 to 7 in exactly the same manner as in Example 1 except that monoethanolamine as the pH-adjusting agent used in Example 1 was changed to respective substances (alkaline substances other than those of the present invention) shown in Table 4. Results are summarized in Table 4. The color feature change and the chromaticness change are large, and the brilliantness is deficient, in which the merit of the use of the basic dye is lost.

TABLE 4

(Comparative Examples 1 to 7)

|  | pH-adjusting agent (1% by weight) | pH | Color feature change | Chromaticness change |
|---|---|---|---|---|
| Co. Ex. 1 | ethylenediamine | 10.8 | 19.3 | 15.7 |
| Co. Ex. 2 | diethylenetriamine | 10.5 | 15.1 | 11.2 |
| Co. Ex. 3 | tetraethylenepentamine | 10.2 | 14.5 | 11.7 |
| Co. Ex. 4 | 1,4-diaminobutane | 9.8 | 13.6 | 10.5 |
| Co. Ex. 5 | 1,7-diaminoheptane | 9.1 | 13.5 | 9.5 |
| Co. Ex. 6 | 1,9-diaminononane | 8.8 | 13.2 | 8.2 |
| Co. Ex. 7 | triethylenediamine | 9.2 | 14.5 | 8.9 |

EXAMPLE 13

Explanation will be made for Example in which C. I. Basic Blue 45 was used as the basic dye, and monoethanolamine corresponding to the formula (1) was used as the pH-adjusting agent. (A) Respective materials shown below were weighed so that the total amount was 100 g, and they were sufficiently mixed and agitated, followed by performing filtration with a membrane filter of 0.2 μm to prepare Ink (b).

TABLE 5

| C. I. Basic Blue 45 | 0.8 parts by weight |
| Polyethylene glycol | 12.2 parts by weight |
| 2-Pyrrolidone | 12.0 parts by weight |
| Diethylene glycol monomethyl ether | 6.0 parts by weight |
| Monoethanolamine (pH-adjusting agent) | 1.0 parts by weight |
| Pure water | 68.0 parts by weight | pH of Ink (b) was measured in the same manner as described above. pH was alkaline, i.e., 10.2. (B) In order to investigate the degree of the change of the chromaticness of Ink (b) brought about by the addition of monoethanolamine, Ink (b-1) having the following composition, which did not contain monoethanolamine, was prepared. The preparation method was the same as that described above. That is, respective materials were weighed so that the total amount was 100 g, and they were sufficiently mixed and agitated, followed by performing filtration with a membrane filter of 0.2 μm.

TABLE 6

| C. I. Basic Blue 45 | 0.8 parts by weight |
| Polyethylene glycol | 12.2 parts by weight |
| 2-Pyrrolidone | 12.0 parts by weight |
| Diethylene glycol monomethyl ether | 6.0 parts by weight |
| Pure water | 69.0 parts by weight | pH of Ink (b-1) was measured in accordance with the same method as that described above. pH was low and acidic, i.e., 5.4.

Printing was performed in accordance with the same method as that described above with Ink (b) and Ink (b-1), and the color measurement (measurement of L*, a*, b*) was performed in accordance with the same method as that described above to calculate the color feature change and the chromaticness change in accordance with the numerical expression (1) described above, provided that (a) is substituted with (b) and (a-1) is substituted with (b-1). The color feature change was 2.2, and the chromaticness change was 1.3, in each of which the amount of change was small. It is appreciated that any inconvenience such as discoloration is not caused by the addition of monoethanolamine as the pH-adjusting agent.

EXAMPLES 14 TO 18

Experiments were carried out in Examples 14 to 18 in exactly the same manner as in Example 13 except that monoethanolamine as the pH-adjusting agent used in Example 13 was changed to respective substances shown in Table 7. Results are summarized in Table 7 together with Example 13. The pH-adjusting agent of the formula (1) was used for Examples 13 to 15, the pH-adjusting agent of the formula (2) was used for Example 16, and the pH-adjusting agent of the formula (3) was used for Examples 17 and 18.

TABLE 7

(Examples 13 to 18)

|  | pH-adjusting agent (1% by weight) | pH | Color feature change | Chromaticness change |
|---|---|---|---|---|
| Example 13 | monoethanolamine | 10.2 | 2.2 | 1.3 |
| Example 14 | diethanolamine | 10.0 | 1.0 | 1.0 |

TABLE 7-continued (Examples 13 to 18)

| | pH-adjusting agent (1% by weight) | pH | Color feature change | Chromaticness change |
|---|---|---|---|---|
| Example 15 | triethanolamine | 8.7 | 4.3 | 1.7 |
| Example 16 | 1N potassium hydroxide | 9.1 | 2.9 | 0.6 |
| Example 17 | ammonium hydrogencarbonate | 8.2 | 0.5 | 1.1 |
| Example 18 | sodium carbonate | 11.0 | 1.9 | 0.7 |

COMPARATIVE EXAMPLES 8 TO 11

Experiments were carried out in Comparative Examples 8 to 11 in exactly the same manner as in Example 13 except that monoethanolamine as the pH-adjusting agent used in Example 13 was changed to respective substances (alkaline substances other than those of the present invention) shown in Table 8. Results are summarized in Table 8. The color feature change and the chromaticness change are large, and the brilliantness is deficient, in which the merit of the use of the basic dye is lost.

TABLE 8

(Comparative Examples 8 to 11)

| | pH-adjusting agent (1% by weight) | pH | Color feature change | Chromaticness change |
|---|---|---|---|---|
| Co. Ex. 8 | ethylenediamine | 11.2 | 17.1 | 14.7 |
| Co. Ex. 9 | diethylenetriamine | 10.5 | 13.7 | 12.3 |
| Co. Ex. 10 | tetraethylenepentamine | 10.2 | 14.5 | 11.5 |
| Co. Ex. 11 | 1,4-diaminobutane | 9.6 | 12.6 | 11.8 |

EXAMPLE 19

Explanation will be made for Example in which C. I. Basic Violet 11:1 was used as the basic dye, and monoethanolamine corresponding to the formula (1) was used as the pH-adjusting agent. (A) Respective materials shown below were weighed so that the total amount was 100 g, and they were sufficiently mixed and agitated, followed by performing filtration with a membrane filter of 0.2 μm to prepare Ink (c).

TABLE 9

| C. I. Basic Violet 11:1 | 0.8 parts by weight |
|---|---|
| Polyethylene glycol | 12.2 parts by weight |
| N-methyl-2-pyrrolidone | 12.0 parts by weight |
| Triethylene glycol monobutyl ether | 6.0 parts by weight |
| Monoethanolamine (pH-adjusting agent) | 1.0 parts by weight |
| Pure water | 68.0 parts by weight | pH of Ink (c) was measured in accordance with the same method as that described above. pH was alkaline, i.e., 10.8. (B) In order to investigate the degree of the change of the chromaticness of Ink (c) brought about by the addition of monoethanolamine, Ink (c-1) having the following composition, which did not contain monoethanolamine, was prepared. The preparation method was the same as that described above. That is, respective materials were weighed so that the total amount was 100 g, and they were sufficiently mixed and agitated, followed by performing filtration with a membrane filter of 0.2 μm.

TABLE 10

| C. I. Basic Violet 11:1 | 0.8 parts by weight |
|---|---|
| Polyethylene glycol | 12.2 parts by weight |
| N-methyl-2-pyrrolidone | 12.0 parts by weight |
| Triethylene glycol monobutyl ether | 6.0 parts by weight |
| Pure water | 69.0 parts by weight | pH of Ink (c-1) was measured in accordance with the same method as that described above. pH was low and acidic, i.e., 5.2.

Printing was performed in accordance with the same method as that described above with Ink (c) and Ink (c-1), and the color measurement (measurement of L*, a*, b*) was performed in accordance with the same method as that described above to calculate the color feature change and the chromaticness change in accordance with the numerical expression (1) described above, provided that (a) is substituted with (c) and (a-1) is substituted with (c-1). The color feature change was 5.2, and the chromaticness change was 2.1, in each of which the amount of change was small. It is appreciated that any inconvenience such as discoloration is not caused by the addition of monoethanolamine as the pH-adjusting agent.

EXAMPLES 20 TO 24

Experiments were carried out in Examples 20 to 24 in exactly the same manner as in Example 19 except that monoethanolamine as the pH-adjusting agent used in Example 19 was changed to respective substances shown in Table 11. Results are summarized in Table 11 together with Example 19. The pH-adjusting agent of the formula (1) was used for Examples 19 to 21, the pH-adjusting agent of the formula (2) was used for Example 22, and the pH-adjusting agent of the formula (3) was used for Examples 23 and 24.

TABLE 11

(Examples 19 to 24)

| | pH-adjusting agent (1% by weight) | pH | Color feature change | Chromaticness change |
|---|---|---|---|---|
| Example 19 | monoethanolamine | 10.8 | 5.2 | 2.1 |
| Example 20 | N-methyl-2,2-iminodiethanol | 9.7 | 2.8 | 4.0 |
| Example 21 | diisopropanolamine | 9.7 | 3.1 | 2.5 |
| Example 22 | 1N potassium hydroxide | 8.9 | 3.3 | 0.6 |
| Example 23 | ammonium hydrogencarbonate | 8.7 | 1.1 | 1.2 |
| Example 24 | sodium carbonate | 11.2 | 3.3 | 1.2 |

COMPARATIVE EXAMPLES 12 TO 15

Experiments were carried out in Comparative Examples 12 to 15 in exactly the same manner as in Example 19 except that monoethanolamine as the pH-adjusting agent used in Example 19 was changed to respective substances (alkaline substances other than those of the present invention) shown in Table 12. Results are summarized in Table 12. The color feature change and the chromaticness change are large, and the brilliantness is deficient, in which the merit of the use of the basic dye is lost.

TABLE 12

(Comparative Examples 12 to 15)

| | pH-adjusting agent (1% by weight) | pH | Color feature change | Chromaticness change |
|---|---|---|---|---|
| Co. Ex. 12 | ethylenediamine | 11.3 | 22.3 | 18.7 |
| Co. Ex. 13 | diethylenetriamine | 10.9 | 18.1 | 13.3 |
| Co. Ex. 14 | tetraethylenepentamine | 10.4 | 17.5 | 12.5 |
| Co. Ex. 15 | 1,4-diaminobutane | 9.9 | 15.6 | 11.8 |

According to the results in Tables 3, 4, 7, 8, 11, and 12 shown above, pH is neutral or alkaline in all of Examples and Comparative Examples, in which it is considered that no problem arises in view of the corrosion of metal parts. However, the changes of the color feature and the chromaticness are evaluated as follows. That is, the changes are small in all of Examples of the present invention, in which the inks are sufficiently practical. However, in respective Comparative Examples, the changes are large, in which the brilliantness is deficient, and the merit of the use of the basic dye is lost.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
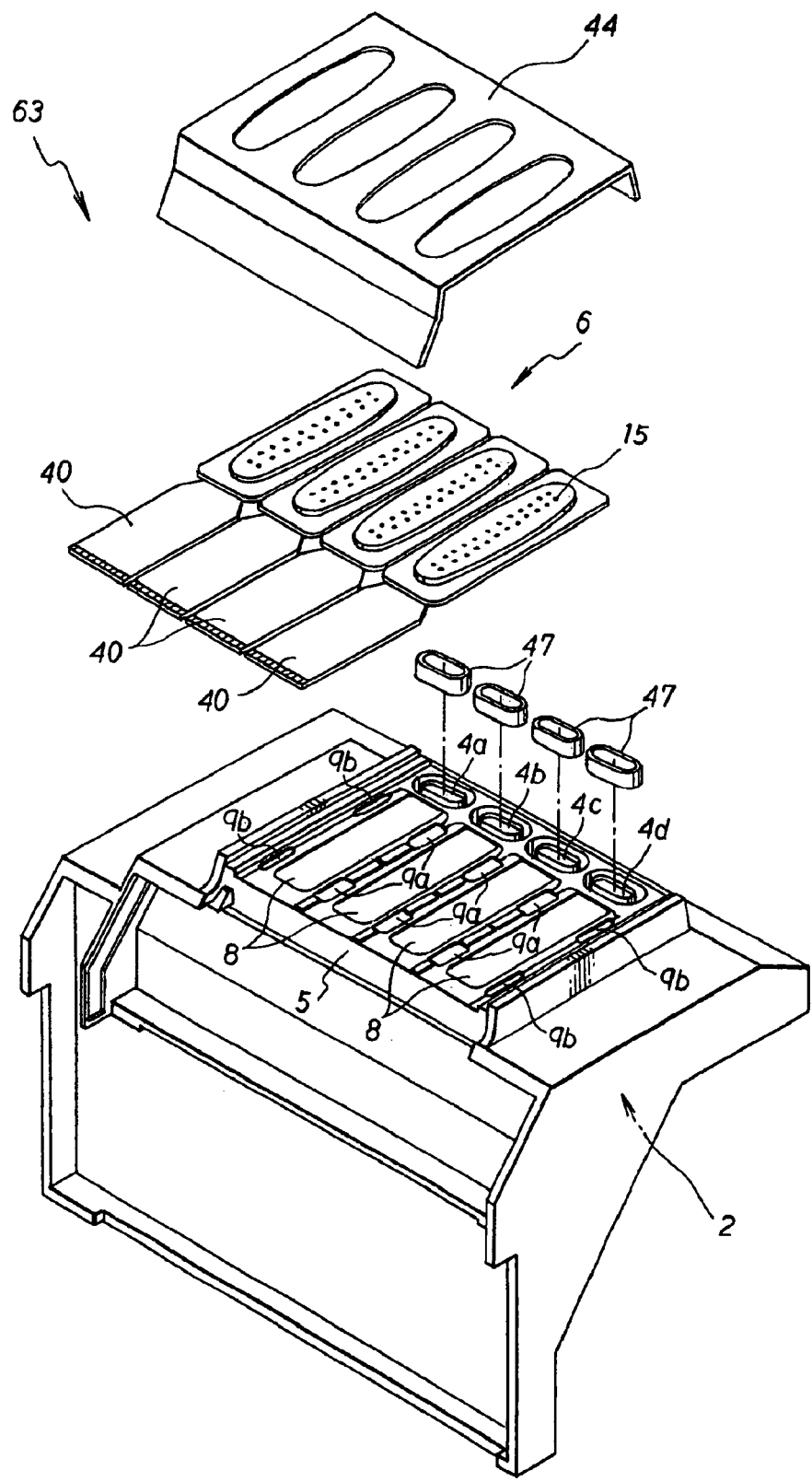
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
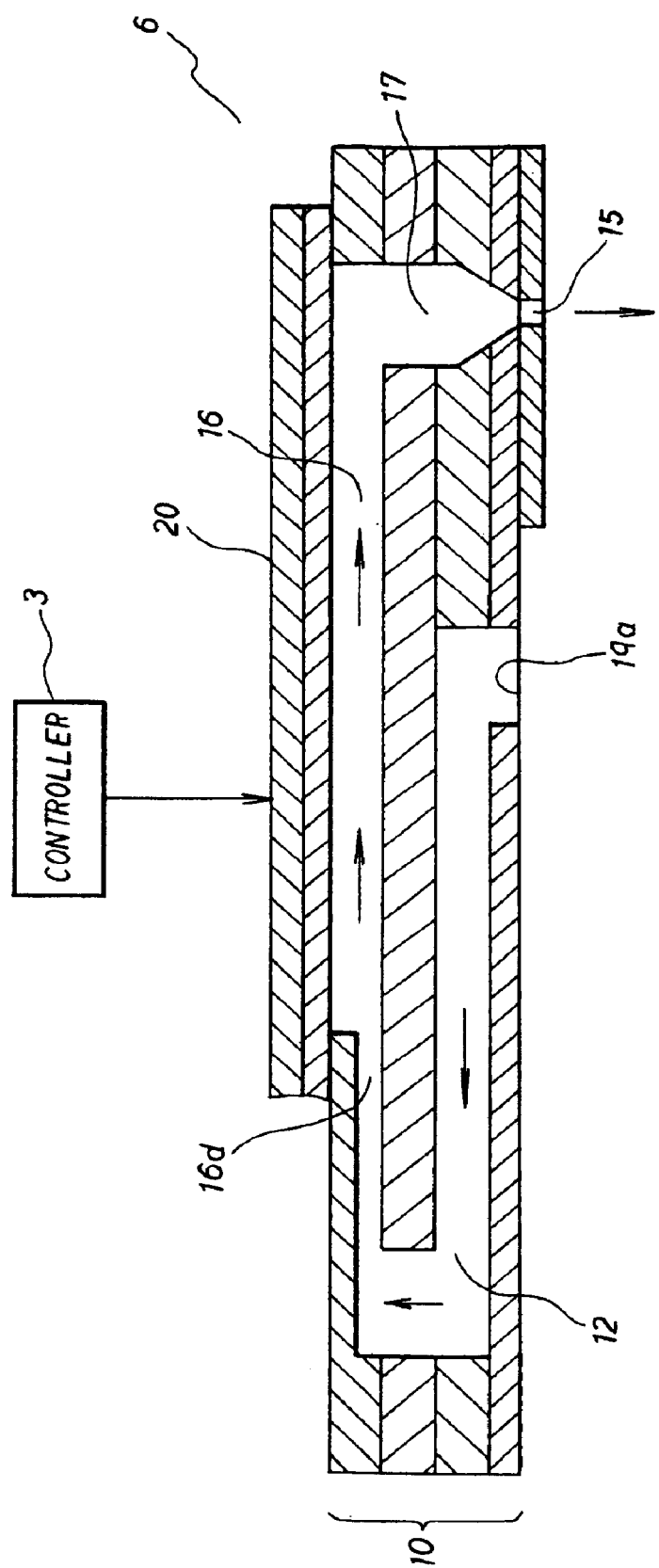
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can he controlled with a technique disclosed in, for example, U.S. Pat. Nos. 6,312,089, 6,412,923 and 6,460,959. Further, the detailed structure of the printer and controlling method of the head unit are also disclosed in these U.S. patents, a content of which has been incorporated herein by reference.

As clarified from the foregoing explanation, the water base ink for ink-jet recording according to the present invention uses the pH-adjusting agent represented by the formulas (1), (2), and (3). Accordingly, the brilliant chromaticness is retained, and it is possible to prevent the metal parts of the ink jet printer from the corrosion which would be otherwise caused by the ink.

What is claimed is:

1. An ink for ink-jet recording comprising:
   water;
   at least one basic dye selected from the group consisting of: C. I. Basic Red 1, C. I. Basic Yellow 40, C. I. Basic Blue 45, C. I. Basic Orange and C. I. Basic Violet 11:1; and at least one pH-adjusting agent selected from compounds represented by the following general formulas (1) to (3):

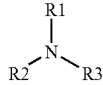  (1)

wherein each of R1, R2, and R3 is independently H, an alkyl group, or an alkyl group partially substituted with OH;

MOH  (2)

wherein M represents a monovalent metal;

ACO$_3$  (3)

wherein A represents a monovalent metal or a group having ammonium; and wherein pH of the ink is not less than 6.8.

2. The ink according to claim 1, wherein the pH-adjusting agent is the compound represented by the general formula (1).

3. The ink according to claim 2, wherein the pH-adjusting agent is monoethanolamine or diethanolamine.

4. The ink according to claim 1, wherein the pH-adjusting agent is the compound represented by the general formula (3).

5. The ink according to claim 4, wherein the pH-adjusting agent is ammonium hydrogencarbonate or sodium carbonate.

6. The ink according to claim 1, wherein the pH-adjusting agent is contained in the ink in an amount of 0.001 to 2% by weight.

7. The ink according to claim 1, wherein the pH-adjusting agent is contained in the ink in an amount of 0.01 to 1% by weight.

8. An ink-jet recording apparatus comprising:

an ink-jet head;

an ink tank which accommodates an ink to be supplied to the ink-jet head; and the ink as defined in claim 1 which is accommodated in the ink tank.

9. An ink for ink-jet recording comprising:

water;

at least one basic dye selected from the group consisting of: C. I. Basic Yellow 1, 2, 11, 13, 14, 19, 21, 25, 32, 33, 36, 37, 40, 51; C. I. Basic Orange 2, 15, 21, 22; C. I. Basic Red 1, 1:1, 2, 5, 6, 8, 9, 12, 13, 14, 19, 22, 29, 37, 38, 39, 92; C. I. Basic Violet 1, 2, 3, 4, 7, 10, 11:1, 14; C. I. Basic Blue 1, 3, 4, 5, 6, 7, 9, 11, 12, 16, 17, 19, 24, 25, 26, 28, 29, 41, 45, 54, 65, 66; C. I. Basic Green 1, 4; C. I. Basic Brown 1, 12; C. I. Basic Black 2 and 8; and at least one pH-adjusting agent selected from compounds represented by the following general formulas (1) to (3):

  (1)

wherein each of R1, R2, and R3 is independently H, an alkyl group, or an alkyl group partially substituted with OH;

MOH  (2)

wherein M represents a monovalent metal;

ACO$_3$  (3)

wherein A represents a monovalent metal or a group having ammonium; and wherein pH of the ink is not less than 6.8.

10. The ink according to claim 9, wherein the pH-adjusting agent is the compound represented by the general formula (1).

11. The ink according to claim 10, wherein the pH-adjusting agent is monoethanolamine or diethanolamine.

12. The ink according to claim 9, wherein the pH-adjusting agent is the compound represented by the general formula (3).

13. The ink according to claim 12, wherein the pH-adjusting agent is ammonium hydrogencarbonate or sodium carbonate.

14. The ink according to claim 9, wherein the pH-adjusting agent is contained in the ink in an amount of 0.001 to 2% by weight.

15. The ink according to claim 9, wherein the pH-adjusting agent is contained in the ink in an amount of 0.01 to 1% by weight.

16. An ink-jet recording apparatus comprising:

an inkjet head;

an ink tank which accommodates an ink to be supplied to the ink-jet head; and the ink as defined in claim 9 which is accommodated in the ink tank.

* * * * *

UNITED STATES PATENT AND TRADEMARK OFFICE
CERTIFICATE OF CORRECTION

PATENT NO. : 7,021,752 B2 Page 1 of 1
APPLICATION NO. : 10/246237
DATED : April 4, 2006
INVENTOR(S) : Satoh et al.

It is certified that error appears in the above-identified patent and that said Letters Patent is hereby corrected as shown below:

Col. 14, line 46, replace "inkjet" with --ink-jet--.

Signed and Sealed this

Fourth Day of July, 2006

JON W. DUDAS
*Director of the United States Patent and Trademark Office*